US012168596B2

(12) United States Patent
Hunsaker

(10) Patent No.: US 12,168,596 B2
(45) Date of Patent: Dec. 17, 2024

(54) SIMULTANEOUSLY OPPOSITELY ROTATING SHEAVES

(71) Applicant: Steven A. Hunsaker, Gibson City, IL (US)

(72) Inventor: Steven A. Hunsaker, Gibson City, IL (US)

( * ) Notice: Subject to any disclaimer, the term of this patent is extended or adjusted under 35 U.S.C. 154(b) by 905 days.

(21) Appl. No.: 17/242,033

(22) Filed: Apr. 27, 2021

(65) Prior Publication Data

US 2021/0331901 A1 Oct. 28, 2021

Related U.S. Application Data

(60) Provisional application No. 63/015,934, filed on Apr. 27, 2020.

(51) Int. Cl.
*B66D 3/26* (2006.01)
*B66C 1/12* (2006.01)

(52) U.S. Cl.
CPC .................. *B66D 3/26* (2013.01); *B66C 1/12* (2013.01); *B66D 2700/025* (2013.01); *B66D 2700/028* (2013.01)

(58) Field of Classification Search
CPC ................ B66D 3/26; B66D 2700/025; B66D 2700/028; B66C 1/12; B66C 13/085
See application file for complete search history.

(56) References Cited

U.S. PATENT DOCUMENTS

| | | | | |
|---|---|---|---|---|
| 3,709,548 A * | 1/1973 | Hogshead | B66C 1/125 294/82.12 |
| 3,945,675 A * | 3/1976 | Tsuyama | B66C 1/10 294/81.1 |
| 8,733,739 B2 * | 5/2014 | Mauthner | A63B 29/02 254/408 |
| 2010/0237641 A1 * | 9/2010 | Drent | B66C 1/34 294/82.11 |
| 2011/0154642 A1 * | 6/2011 | Drent | B66D 3/06 29/428 |

* cited by examiner

*Primary Examiner* — Stephen A Vu
(74) *Attorney, Agent, or Firm* — Charles McCloskey

(57) ABSTRACT

Simultaneously oppositely rotating sheaves, or a chain fall, has a two sheaves upon a hexagonal axle. The first sheave receives a first line clockwise and the second sheave receives a second line counterclockwise. Upon turning the axle, the sheaves handle the lines oppositely. A signal unit regulates power delivered from a power unit to at least one motor. The power unit is preferably a battery or alternatively another source. The motor turns a gearbox that engages the axle cooperating with the sheaves. The chain fall includes an anti-two block per line. Preferably, a pulley has two outer plates and two inner plates on stubs with the first line in the center and the two second lines between an inner plate and an outer plate. A first plate and a spaced away second plate contain the components of the invention in compact form for usage by a crane.

12 Claims, 5 Drawing Sheets

SIMULTANEOUSLY OPPOSITELY ROTATING SHEAVES

CROSS-REFERENCE TO RELATED APPLICATIONS

This non-provisional application claims priority to provisional application Ser. No. 63/015,934 filed on Apr. 27, 2021 which is owned by the same inventor.

BACKGROUND OF THE INVENTION

The present invention relates generally to rigging for lifting large objects and more particularly to a device that winds and unwinds two flexible elongated members simultaneously.

Long ago, people used beasts of burden to turn drums and capstans that took up ropes and chains. The ropes and chains carried loads from cargo at their ends. In time, architects and masons developed gin poles and cranes. These supplied mechanical advantage, allowed for lifting of loads, and adjusted placement of loads. Loads though continued growing in length and weight as time moved along. Early loads were long stone blocks while recent loads became wooden beams, wooden trusses, and then steel beams, wings, and the like.

Once more, technology moved along. In time, beasts of burden became replaced by engine powered equipment. Cranes of fixed and mobile form developed yet the loads continued to come. Cranes developed more and more lifting capacity, safety features, and endurance. Loads though began to acquire more length. A bridge girder, an airplane wing, a windmill blade, a power plant component, and the like may have a length or widest dimension over forty feet. Lifting such a length presents challenges to the lifting contractor, or rigger.

From a statics basis, attaching a cable to the center of gravity of a long load allows a crane to lift it. The crane's engine will turn gearing and the cable will spool up and lift the load. Alas, from a dynamics basis, a long load takes a bit more than a straight up dead lift. A long load becomes subject to wind, insect and bird dead load, off center hook-up, imparted cable torsion, sticky ground chocks, and like forces that apply off center to the lifting force. Without much time and with little inattention, a long load starts to sway readily upon lifting.

DESCRIPTION OF THE PRIOR ART

Riggers have used spanner poles for centuries, borrowing them from sailing vessels and the docks. A rigger utilizes two lifting stays connected to a long load and then connects the free ends of the two stays to the ends of a spanner pole. The spanner pole has its length of at least six feet that spreads apart the load from a long load. Opposite the two stays, the spanner pole receives the lifting cable from a crane or other equipment. The two stays typically have fixed lengths making it more difficult for a long load to sway vertically.

Riggers have used chain falls for many decades. A chain fall has a rotating mechanism within a suspended housing upon a lifting cable. The chain fall admits chain upon its rotating mechanism so that the chain may pass upwardly and downwardly as the rotating mechanism turns. The chain has two free ends outwardly of the rotating mechanism that extend downwardly to secure a load. The chain may have a spanner pole for spacing apart the free ends as they secure a long load. As the rotating mechanism turns, so turns the chain where one free end is taken up and the other free end is paid out.

In select chain falls, the rotating mechanism has a dog, a pawl, or a motor, that regulates speed, direction, or both so that the free ends of the chain attain desired locations. But, a chain remains as strong as its weakest link. If a link fails, the chain separates and drops from the rotating mechanism thus causing any load upon it to drop, or worse, crash to the ground below. As in all rigging, one must be careful when near or under a load.

SUMMARY OF THE INVENTION

The simultaneously oppositely rotating sheaves, or chain fall, has a first sheave, a second sheave, and at least one gearbox coaxial upon a hexagonal axle. The first sheave receives a first line wrapped clockwise and the second sheave receives a second line wrapped counterclockwise. Thus upon turning the axle, the sheaves handle the lines oppositely. A signal unit regulates power delivered from a power unit to at least one motor. The motor turns at least one gearbox that engages the axle cooperating with the sheaves. The chain fall includes a pair of anti-two blocks. A first plate and a spaced away second plate contain the components of the invention in compact form for usage by a crane.

There has thus been outlined, rather broadly, the more important features of the invention in order that the detailed description thereof that follows may be better understood and that the present contribution to the art may be better appreciated. The invention also has simultaneous rotation of the two sheaves as they handle the lines oppositely, a worm gear for the drive gear, rounded ends on the axle, and additional features of the invention will be described hereinafter and which will form the subject matter of the claims attached.

Numerous objects, features and advantages of the present invention will be readily apparent to those of ordinary skill in the art upon a reading of the following detailed description of the presently preferred, but nonetheless illustrative, embodiment of the present invention when taken in conjunction with the accompanying drawings. Before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, the phraseology and terminology employed herein are for the purpose of description and should not be regarded as limiting.

One object of the present invention is to provide a chain fall that operates on external power, electrical, pneumatic, or hydraulic, or an onboard battery.

Another object is to provide such a chain fall that simultaneously adjusts the length of two lines in opposite directions.

Another object is to provide such a chain fall that reduces rigger occupational injuries and downtime.

Another object is to provide such a chain fall that has a low cost of manufacturing so the purchasing rigging contractors, operators, lines, shops, suppliers, vendors, and warehouses can readily buy the chain fall through supply houses, catalogs, and select stores.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In referring to the drawings.

The same reference numerals refer to the same parts throughout the various figures.

DESCRIPTION OF THE PREFERRED EMBODIMENT

The present invention overcomes the prior art limitations by providing simultaneously oppositely rotating sheaves for riggers, crane operators, and the lifting industry. The invention allows a rigger or user to raise or to lower two elongated members simultaneously. The invention begins with an alternate embodiment of two sheaves as later shown and described. The preferred embodiment follows from there.

Figure 1:
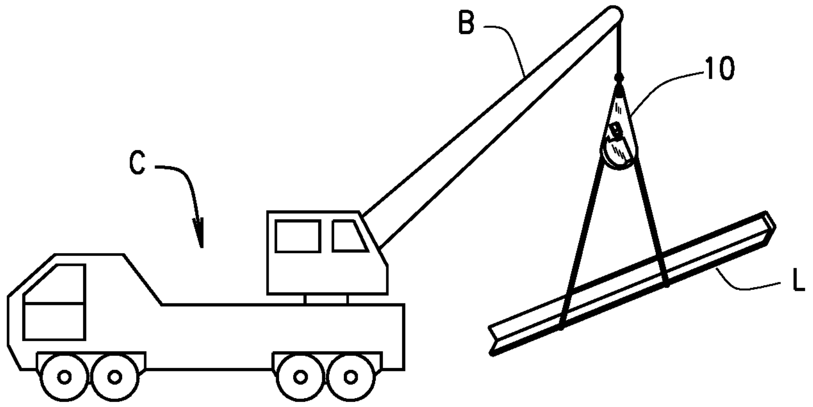
FIG. 1 is a front view of the present invention in usage.

Turning to FIG. 1, a prior art crane C appears in usage with its boom B extended rearward from the operating cab of the crane. Upon the boom opposite the operating cab, the boom has its cable shown descending downward to the invention 10 of simultaneously oppositely rotating sheaves, also known as a chain fall. The invention has two lines descending to an elongated oblong load L.

Figure 2:
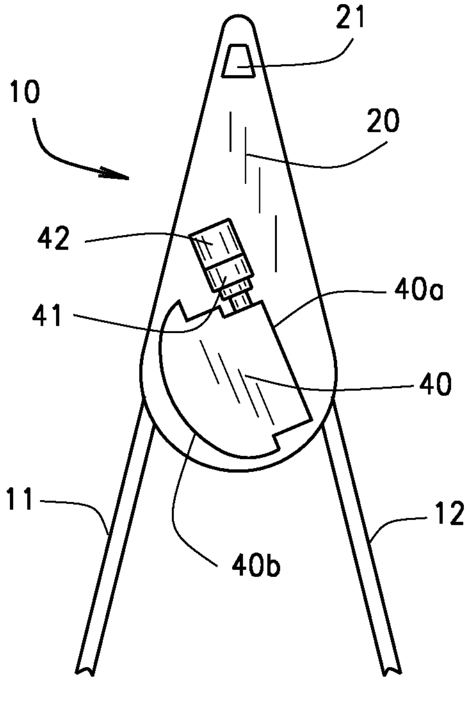
FIG. 2 is a front view of the present invention.

The simultaneously oppositely rotating sheaves device of the present invention appears as at 10 in FIG. 2 in a front view. The invention has a generally oblong shape with a wide portion and a narrow portion and the narrow portion being positioned above the wide portion during usage and as shown. The invention has two lines extending downwardly from the wide portion. The two lines include a first line 11 here shown towards the left and a second line 12 here shown towards the right. The first line and the second line have a generally flexible elongated form. In the preferred embodiment, the first line and the second line have the form of artificial rope with sufficient tensile strength for anticipated rigging loads. The two lines extend from the invention beneath a plate 20 having the oblong shape of the invention akin to a pear like shape. The plate has a rounded bottom approaching semicircular where bottom denotes opposite the boom B of a crane or what a rigger would see from below the invention during its usage. Centered in the rounded bottom, the plate has an axle 30, as later shown, perpendicular to a plane defined by the plate. Outwardly from the axle, the invention has a gearbox 40 with a flat face 40*a* oriented partially upward and opposite the flat face it has a curved face 40*b* generally shaped to follow the bottom of the plate. Generally aligned with the flat face, a motor 41 extends tangential to the curved face 40*b*. The motor operatively engages the gearbox. Outwardly from the gearbox 40, the motor 41 has its signal unit 42 for communications to an operator. Above the gearbox and opposite the rounded bottom, the plate has an aperture 21 of a somewhat trapezoidal shape, or other shape, suitable for admitting the free tip of the bight of a hook on the pill of a crane. The plate has a length greater than the twice the radius of the bottom portion.

Figure 3:
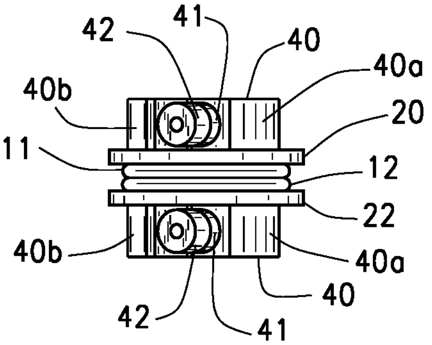
FIG. 3 is a top view of the present invention.

Turning the invention, FIG. 3 shows a top view of it that is, as a rigger sees it when fitting the invention to the hook of the crane C. The invention 10 has its first line 11 to the left and the second line 12 to the right. The lines extend outwardly from beneath the plate 20, here shown on end where the plate has its thickness and a rectangular cross section. Opposite the plate 20, the invention has a second plate 22 of similar shape as the first plate, as later shown. The second plate also has its thickness and a rectangular cross section. Below the plate 20, the invention has its first sheave, —for the first line 11—later shown in FIG. 8 as 46*a*, with its own diameter but less than the width of the plate. Beneath the first sheave, the invention 10 has its second sheave, —for the second line 12—later shown in FIG. 8 as 46*b*, of the same diameter as the first sheave. Beneath the second sheave as shown, the invention has the second plate 22. The two sheaves have a coaxial alignment along a vertical axis in this figure and upon the axle centrally located within the sheaves and the gearboxes. The first sheave takes up and pays out the first line 11 while the second sheave takes up and pays out the second line 12.

More importantly, during usage of the invention, the two lines extend opposite from each other. That is, as the first sheave and the second sheave turn simultaneously in the same direction, the invention has the first line shorten as the first sheave takes it up and the second line lengthen as the second sheave pays it out. The first sheave and the second sheave each have the same diameters and thicknesses along with a cross sectional shape suitable for receiving the first line and the second line respectively and storing at least two wraps of the first line and the second line upon them respectively.

Outwardly from the plate 20, that is, upward in the figure, the invention has its gearbox 40 here shown with a height noticeably more than the thickness of the plate. The gearbox has its motor 41 extending outwardly, here shown to the left, and has the signal unit 42 upon its end outward from the plate. Opposite plate 20 and the two sheaves, the invention has its second plate 22 of the same shape as the plate. The second plate also has a gearbox 40 here shown with a height noticeably more than the thickness of the plate. The gearbox has its motor 41 extending outwardly, here shown to the left, and has the signal unit 42 upon its end outward from the plate. The first plate 20 here shown towards the top of the figure has the narrow portion of the plate towards the center of the view displaying a tip, centered on the plate. The tip adjoins the hook provided from a crane C not shown. The tip represents the narrowest part of the plate. Opposite the plate 20, the invention has its second plate 22 also with an aligned tip shown in the center of the view. In the preferred embodiment, the invention has a gearbox and motor upon the plate and the second plate. In an alternate embodiment, the invention has one gearbox and one motor just upon the plate.

Figure 4:
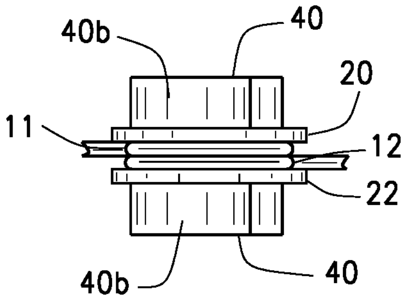
FIG. 4 is a bottom view of the present invention.

FIG. 4 shows a top view of the invention, that is, opposite that of FIG. 3, or as a rigger sees it from below during usage of the invention. The invention has its first plate 20 here shown towards the top of the figure with the wide rounded bottom portion of the plate towards the center of the view, centered on the plate. The bottom represents the lowest portion of the plate below the widest portion into the plane of this figure. Opposite the plate 20, the invention has its second plate 22 also with an aligned bottom in registration with its counterpart in the plate. As before, the plate and the second plate have a rectangular cross section that widens inwardly from the tip. Between the plates, the invention has its two sheaves as described above.

Shown above the plate 20 the invention has one of two gearboxes 40 with a motor 41 and signal unit 42 extending to the right in this figure. The second plate 22 also has its gearbox 40 with a motor 41 and signal unit 42 extending to the right in this figure and the same direction as the other gearbox. The gearboxes have a fixed connection to the axle and deliver motive power to turn the first sheave and the second sheave simultaneously. The motive power reaches the sheaves from the electric motors 41 turning upon command from the signal units 42. The signal units have their locations away from the motors for best reception of commands from an operator.

Figure 5:
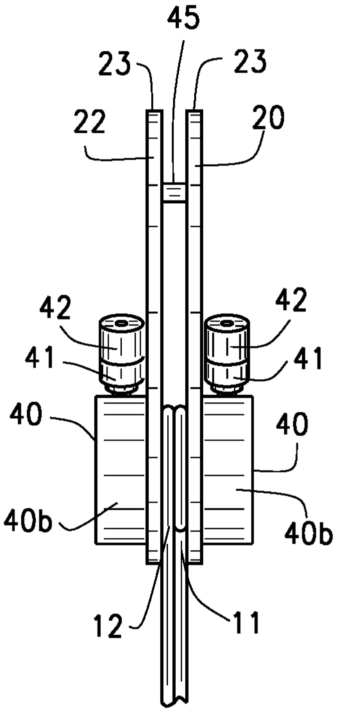
FIG. 5 is a side view of the present invention.

Turning the invention, FIG. 5 provides a side view of the invention with the aperture and tip 23 upwardly. The invention has its first plate 20 spaced to the left of the second plate 22. The two plates align their shapes so the invention has a common perimeter. The invention has its two sheaves stacked upon the axle and between the plates as before, that is, with the first sheave shown to the right in the figure, for line 11. The plate has its gearbox 40 and the second plate has the second gearbox 40 located outwardly of the sheaves. The gearboxes mechanically engage the axle 30, not shown, where the axle rotates upon an axis perpendicular to the motors' 41 axis of rotation. The motors have their locations outwardly from the plates in this figure. The motors each produce at least 2 horsepower. The motors 41 turn the gearboxes 40 which rotate the axle that rotates the two sheaves simultaneously thus paying out the first line 11 while taking in the second line 12. The motors start, turn, stop, and reverse based upon commands from the signal units 42. The signal units have their locations upwardly from the motors in this figure. The signal units operate electrically and receive their own commands from a control unit, not shown, carried by an operator on the ground. The commands to the signal unit arrive by radio upon a select frequency band to avoid interference from other equipment nearby. Opposite the sheaves and towards the right of the invention, the plate 20 has a strut 45 outwardly from the aperture, that is, towards the tip 23. The strut spans between the first plate and the second plate as shown. The strut has a perpendicular orientation to both plates.

Figure 6:
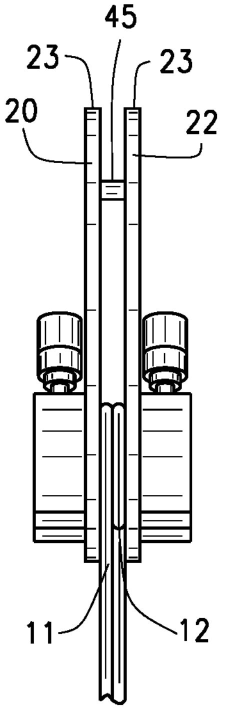
FIG. 6 is a side view of the present invention.

Then FIG. 6 provides an opposite side view from FIG. 5 with the strut 45 and the tip 23 shown upwardly. The invention in this view has the signal units 42 shown well into the plane of the figure with the gearboxes shown forward of the signal units towards the reader. The signal units receive commands from an operator then characterize those commands into instructions for the motor. The motors then start, turn, and stop the gearboxes 40 that turn the axle moving the first sheave and the second sheave simultaneously. The signal units and the motors fit adjacent to their respective plates and towards the exterior of the invention. Inwardly from the gearboxes, towards the center in this figure, two sheaves then have their stacked mutually aligned positions upon the axle within the perimeters of the plate and the second plate.

Figure 7:
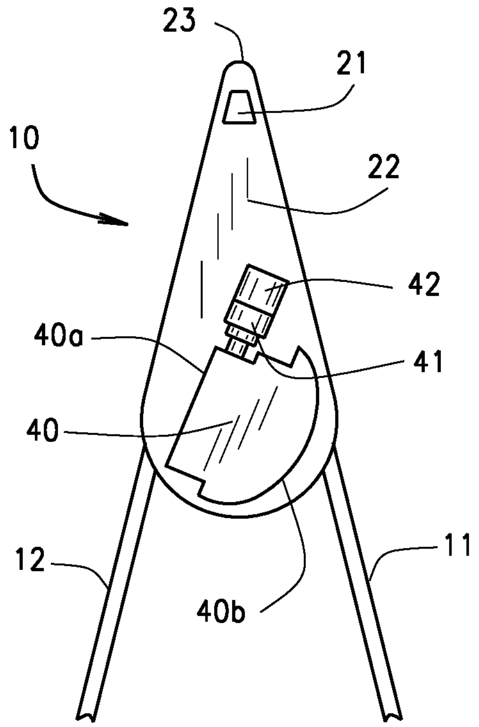
FIG. 7 is a back view of the present invention.

As previously described, the invention has its pear like form with a narrow portion oriented upwardly during usage and wider portion oriented downwardly. The wider portion receives the sheaves that pay in and take out line as shown in the back view of FIG. 7. This figure has the second plate 22 towards the foreground with the aperture 21 shown upwardly towards the tip 23. Opposite the aperture, the invention has a signal unit 42 extending from a motor 41 tangentially connected to a gearbox 40. The gearbox operatively engages the axle 30. Upon the axle, simultaneously turn the first sheave and the second sheave, not shown, that pay out the first line 11 and take up the second line 12 as when the gear turns counterclockwise in this view.

Figure 8:
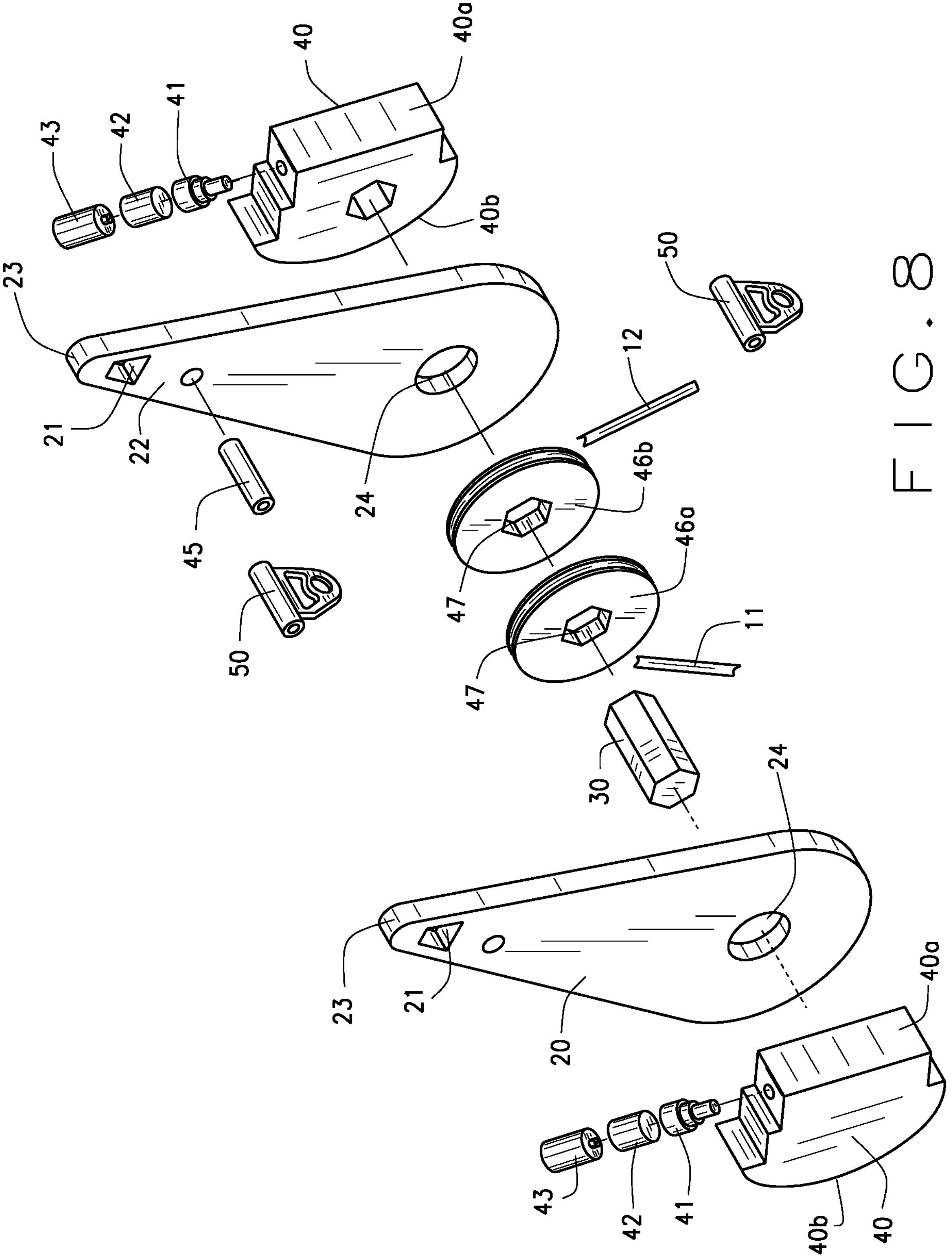
FIG. 8 is an exploded view of the present invention.

Proximate the signal units, the invention has a power supply 43 generally in line with the motors 41 as further shown in FIG. 8. The power supply includes one of an onboard battery, a connection to electrical power produced by a crane utilizing the invention, a connection to a cable for power from a jobsite generator, or a connection to utility service. In an alternate embodiment, the power supply is pneumatic and operates upon air supply delivered to it through a hose from a crane utilizing the invention. In a further alternate embodiment, the power supply is hydraulic that taps into a hydraulic line powered, or actuated, by a crane or other equipment that uses the invention.

Upon command from the signal units 42, the power supply 43 delivers power to the motors 41 that engage the gearboxes 40. The motors have a tangential connection to their respective gearboxes and turn the output of the gearbox clockwise or counterclockwise as the motor itself turns similarly. Motorized turning of the gearboxes makes the axle 30 rotate and the two sheaves upon it. As described above, rotation of the sheaves reels in one line while simultaneously paying out the other line. Reeling in line presents a hazard if an operator permits excessive rotation of the gear and a hook or other rigging item contacts the plates and jams into the sheaves. To prevent this hazard, the invention includes two each anti-two blocks as later shown in FIG. 8 beneath a horizontal transverse centerline through the axle and mutually rotated downwardly to a customary position taken by one of the lines during its reeling in.

Then FIG. 8 shows the present invention in an exploded view of its components. The invention begins as shown towards the lower left with the gearbox 40 orienting its rounded edge 40*b* downward and its flat face 40 upward and leftward in the figure. Up and to the left of the gearbox, the invention has its motor 41 and cooperating signal unit 42 generally shown as collinear. The signal unit provides rotational direction and degree of rotational velocity to the motor. Proximate the signal unit, the power unit 43 delivers power to the motor for its controlled operation during usage. Inward from the gearbox, the invention has its plate 20 here shown upright with its aperture 21 upwardly. Below and on the centerline with the aperture, the plate 20 has its bearing 24 that admits the axle 30.

The bearing has a shape that admits a hexagonal cross section of the axle and allows the axle to extend further into cooperation with the gearboxes. The axle has a hexagonal cross section for its full length. The axle fits into a hexagonal opening 47 centered upon each sheave 46*a*, 46*b*. The axle and hexagonal openings each orient upon a common centerline along the axis of this exploded view. In an alternate embodiment, the axle has one of a press fit, a swage, or external pins utilized to stack the two sheaves compactly for placement within the two plates 20, 22.

Inward from the plate 20 and upon the axle 30, the invention has the first sheave 46*a* and the second sheave 46*b* mutually aligned and stacked. The two sheaves have a common outer diameter and an inner diameter. The two sheaves each have a perimeter and a shaping to an edge along the perimeter where the shaping guides and receives the lines 11, 12. The first sheave receives the first line 11 here shown wrapping clockwise, that is, during reeling in. The second sheave releases the second line 12 here shown unwrapping clockwise, that is, during paying out. The inner diameters of the sheaves cooperate with the outer diameters and thickness of the sheaves to receive nearly the full length of the lines, typically less than fifty feet per line. Outward from the sheaves, the invention has its second plate 22 with its bearing 24 ready to receive the other end of the axle in this figure. The second plate has the same shape as the first plate 20 and similar orientation with its aperture 23 upward on the same line with that of the first plate's aperture. Here shown to the left, the two plates mutually join and reinforce proximate their apertures with the strut 45 here shown as a rounded cylinder and alternatively a tube. Outward and slightly downward from the strut, the invention has its anti-two blocks 50. The anti-two blocks have a generally figure eight like shape in plan view. The upper part of the figure eight like shape pivotally engages the plate 20 and the second plate 22 while the lower opening of the figure eight like shape admits a line through it.

Figure 9:
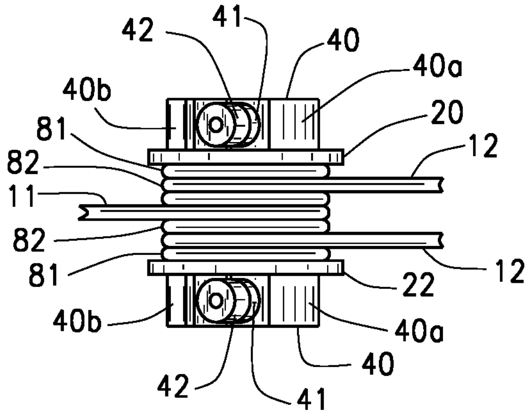
FIG. 9 is a top view of the preferred embodiment of the present invention.

Turning to the preferred embodiment with a single piece combination pulley, FIG. 9 shows a top view of it that is, as a rigger sees it when fitting the invention to the hook of the crane C. The invention 10 has its first line 11 to the left and two second lines 12 here shown extending spaced apart and parallel to the right. The three lines extend outwardly from beneath the plate 20, here shown on end where the plate has its thickness and a rectangular cross section. Opposite the plate 20, the invention has a second plate 22 of similar shape as the first plate, as later shown. The second plate also has its thickness and a rectangular cross section. Below the plate 20, the invention has its pulley with its components shown in use from top to bottom. The pulley has an outer plate 81 with a first diameter, a second line 12 extending to the right and wrapping below the outer plate, an inner plate 82 beneath the upper of the two second lines, the inner plate having its second diameter, the first line 11 extending to the left and wrapping below the inner plate, a second inner plate 82 beneath the first line, a lower second line 12 extending to the right and wrapping below the second inner plate 82, and a second outer plate 81 beneath the lower second line. The two outer plates and two inner plates have a coaxial alignment along a vertical axis in this figure and upon the axle centrally located within the plates and operatively connected to the gearboxes. Each outer plate and nearby inner plate have between them taken up and paid out during usage a second line 12 while the two inner plates have between them taken up and paid out during usage the first line 11.

More importantly, during usage of the invention, the first line extends opposite from how the two second lines extend. This arrangement of lines lifts a load and limits twisting of the load when raised or lowered. That is during usage, as the pulley turns, the outer plates and their adjacent inner plates turn simultaneously in the same direction, the invention has the first line shorten as the pulley takes it up between the two inner plates and the second lines lengthen as the pulley pays it them out. The outer plates and the inner plates have their respective first diameters and second diameters. The first diameters and second diameters are the same. Alternatively, the first diameter is larger than the second diameter. The outer plates and the inner plates preferably have the same thicknesses, or alternatively the outer plates have a greater thickness than the inner plates, or further alternatively, the inner plates have a greater thickness than the outer plates. Concealed beneath the lines in this figure, the pulley has stubs between the outer plates and the inner plates spacing pairs of plates to receive the appropriate lines. The stubs are later shown in FIG. 11. The diameters of the outer plates and the inner plates in cooperation with their thicknesses present a shape suitable for receiving the first line and the two second lines respectively as shown and storing at least two wraps of the first line and the second lines upon them respectively.

Outwardly from the plate 20, that is, upward in the figure, the invention has its gearbox 40 with its height noticeably more than the thickness of the plate. The gearbox has its motor 41 extending outwardly, here shown to the left, and has the signal unit 42 upon its end outward from the plate. Opposite plate 20 and the pulley, the invention has its second plate 22 of the same shape as the plate 20. The second plate also has its gearbox 40 also with a height noticeably more than the thickness of the plate. This gearbox has its motor 41 extending outwardly, here shown to the left, and has the signal unit 42 upon its end outward from the plate. In the preferred embodiment, the invention has a gearbox and motor upon the plate and the second plate. In an alternate embodiment, the invention has one gearbox and one motor just upon the plate.

Figure 10:
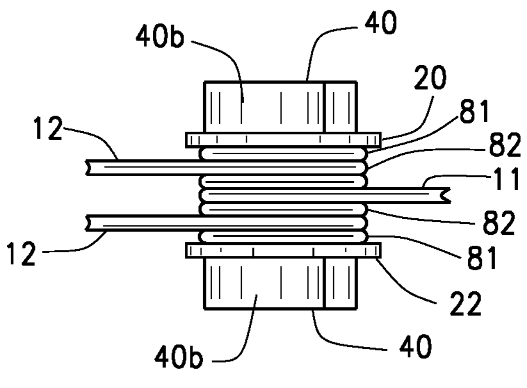
FIG. 10 is a bottom view of the preferred embodiment of the present invention.

FIG. 10 shows a top view of the preferred embodiment of the invention, that is, opposite that of FIG. 9, or as a rigger sees it from below during usage of the invention. The invention has its first plate 20 here shown towards the top of the figure with the narrow portion of the plate towards the center of the view displaying a tip, centered on the plate. The tip adjoins the hook provided from a crane C not shown. The tip represents the narrowest part of the plate but opposite the wide portion of the plate and second plate shown here. As before, the plate and the second plate have a rectangular cross section that widens inwardly from the tip to its maximum into the foreground in this figure. Between the plates, the invention has its pulley with the two outer plates 81, the two inner plates 82, first line 11 and second lines 12 as previously mentioned. In this figure, the first line 11 extends to the right while the second lines 12 extend to the left. The opposing directions of the lines allows them to wrap oppositely upon the pulley though the pulley turns in one direction.

Shown above the plate 20 the invention has one of two gearboxes 40 with a motor and signal unit concealed behind the curved face 40*b* of a gearbox. The second plate 22 also has its gearbox 40 and concealed motor and signal unit in the same direction as the other gearbox. The gearboxes have a fixed connection to the axle and deliver motive power to turn the pulley. The motive power reaches the pulley via the axle from the electric motors 41 turning upon command from the signal units 42. The signal units have their locations away from the motors for best reception of commands from an operator.

Figure 11:
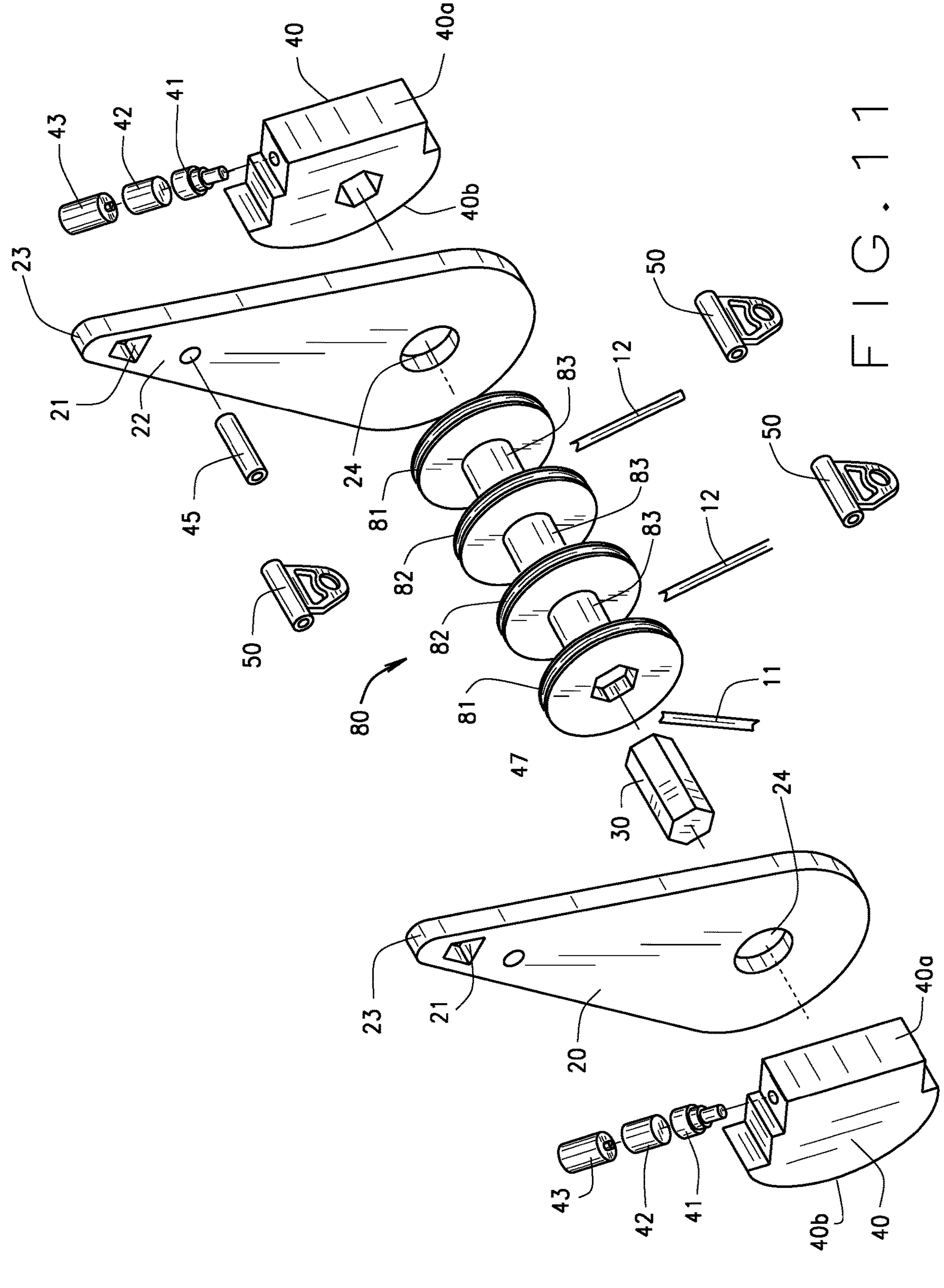
FIG. 11 is an exploded view of the preferred embodiment of the present invention.

And then FIG. 11 shows the preferred embodiment of the present invention in an exploded view of its components. The invention begins as shown towards the lower left with the gearbox 40 orienting its rounded edge 40*b* downward and its flat face 40 upward and leftward in the figure. Each gearbox may contain a worm gear operatively rotated by the coaxial motor and a main gear engaging the worm gear perpendicular. The main gear then connects to the axle. The gearbox regulates the gear ratio between the worm gear and the main gear for delivery of torque to the axle while preventing burn out of the motor during usage. Up and to the left of the gearbox, the invention has its motor 41 and cooperating signal unit 42 generally shown as collinear. The signal unit provides rotational direction and degree of rotational velocity to the motor. Proximate the signal unit, the power unit 43 delivers power to the motor for its controlled operation during usage. Inward from the gearbox, the invention has its plate 20 here shown upright with its aperture 21 upwardly. Below and on the centerline with the aperture, the plate 20 has its bearing 24 that admits the axle 30.

The bearing has a shape that admits a hexagonal cross section of the axle and allows the axle to extend further into cooperation with the gearboxes. The axle has a hexagonal cross section for its full length. The axle fits into a hexagonal opening 47 centered upon a pulley 80 preferably of single piece construction. It has the two spaced apart outer plates 81 and two inner plates 82 equally spaced apart. Each outer plate has a hexagonal opening 47 centered thereon. A stub 83 internally separates each pair of adjacent plates 81, 82 as shown. The Applicant foresees the stubs having suitable shapes for wrapping of line, including hexagonal shown, round, square, triangular, oblong, elliptic, and the like. Each stub has a central hexagonal chamber suitable for admitting the axle 30 therein. Each stub ultimately has a line wrap upon it. The middle stub 83 has the first line 11 wrap upon it while the two other stubs 83, positioned outwardly of the middle, have second lines 12 wrap around them. The axle, hexagonal openings, plates 81, 82, and stubs 83, each orient upon a common centerline along the axis of this exploded view. As above, the axle has one of a press fit, a swage, or external pins utilized for a firm connection to the stubs and plates.

Inward from the plate 20 and upon the axle 30, that is, from left to right, the invention has an outer plate 81 with the shown hexagonal opening 47 then a stub 83 of an inner plate 82. This inner plate spaces away from the outer plate by the stub so that second line 12 enwraps upon the stub. To the right of the inner plate 82, a second stub 83 denotes the middle of the pulley and continues to the second inner plate 82 as shown. The two inner plates mutually space away by the stub so that the first line 11 enwraps the middle stub during usage. The second inner plate oppositely has a third stub 83 extending away, to the right, to the other outer plate 81. The third stub provides a spacing to enwrap the other second line 12. The four plates 81, 82 are mutually parallel and spaced apart. Each plate has a thickness sufficient for rigidity, to support the enwrapped line adjacent, to withstand deflection of the lines against the plates as during wind, and to support the loads imparted by the lines. As above, the outer plates 81 have their first diameter and the inner plates have their second diameter. The four plates have mutual alignment and coaxial stacking upon the axle. Each plate has a perimeter and a shaping to an edge along the perimeter that guides the lines 11, 12 upon the stubs adjacent to the plates. As described, the leftmost stub receives a second line 12 enwrapped upon between the outer plate 81 and the left most inner plate. Then the first line 11 wraps clockwise, that is, during reeling in, upon the middle stub 83 between the two inner plates 82. The pulley releases the first line 11 from the middle stub here shown unwrapping clockwise, that is, during paying out. The diameters and widths of the stubs cooperate with the first diameter of the outer plates and the second diameter of the inner plates to receive nearly the full length of the lines, typically less than fifty feet per line. Outward from the middle stub, the pulley has the other inner plate 82 that continues with the rightmost stub 83 to the other outer plate 81. In the preferred embodiment, the pulley is symmetric upon at least one axis. From the other outer plate at the right, the invention has its second plate 22 with its bearing 24 ready to receive the other end of the axle in this figure. The second plate has the same shape as the first plate 20 and similar orientation with its aperture 23 upward on the same line with that of the first plate's aperture. Here shown to the left, the two plates mutually join and reinforce proximate their apertures with the strut 45 here shown as a rounded cylinder and alternatively a tube. Outward from the strut, the invention has its anti-two blocks 50 for each line. The anti-two blocks have a generally figure eight like shape in plan view. The upper part of the figure eight like shape pivotally engages the plate 20 and the second plate 22 while the lower opening of the figure eight like shape admits a line through it. In an alternate embodiment, the anti-two blocks are electrically powered safety switches.

From the aforementioned description, a chain fall has been described. The chain fall is uniquely capable of simultaneously adjusting the length of two lines in opposite directions. Further, the chain fall may also have anti-two blocks and other related features compatible with the structure and purpose of the invention as shown and described. The chain fall and its various components may be manufactured from many materials, including but not limited to, ferrous and non-ferrous metal foils, their alloys, composites, polymers, such as nylon, polypropylene, polyvinyl chloride, high density polyethylene, polypropylene, and other materials.

Various aspects of the illustrative embodiments have been described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations have been set forth in order to provide a thorough understanding of the illustrative embodiments. However, it will be apparent to one skilled in the art that the present invention may be practiced without the specific details. In other instances, well known features are omitted or simplified in order not to obscure the illustrative embodiments.

Various operations have been described as multiple discrete operations, in a manner that is most helpful in understanding the present invention, however, the order of description should not be construed as to imply that these operations are necessarily order dependent. In particular, these operations need not be performed in the order of presentation.

Moreover, in the specification and the following claims, the terms "first," "second," "third" and the like—when they appear—are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to ascertain the nature of the technical disclosure. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

As such, those skilled in the art will appreciate that the conception, upon which this disclosure is based, may readily be utilized as a basis for the designing of other structures, methods and systems for carrying out the several purposes of the present invention. Therefore, the claims include such equivalent constructions insofar as they do not depart from the spirit and the scope of the present invention.

I claim:

1. A rigging device, comprising:

a first sheave having a first line wrapped in one direction thereon;

at least one second sheave having a second line wrapped in an opposite direction thereon, said at least one second sheave in registration with said first sheave;

an axle operatively connecting through said first sheave and said at least one second sheave, wherein said axle turns said first sheave and said at least one second sheave simultaneously;

at least one gear box operatively engaging said axle, at least one motor turning said at least one gear box, at least one signal unit controlling said motor, and at least one power unit supplying power to said at least one motor;

said first sheave and said at least one second sheave each having a hexagonal centered opening in mutual registration; and, said axle having two ends between a length and a hexagonal cross section along the length, said hexagonal cross section fitting tightly into said openings of said first sheave and said at least one second sheave.

2. The rigging device of claim 1, further comprising:

a first plate and a mutually parallel and spaced apart second plate;

said first plate having a bearing receiving an end of said axle; and said second plate having a bearing receiving the other end of said axle;

wherein said axle rotates in said bearing during usage.

3. The rigging device of claim 2, further comprising:

an anti-two block connecting to said first plate and said second plate upon at least one strut and operatively engaging said first line; and an anti-two block operatively engaging each of said at least one second line and connecting to said first plate and said second plate upon at least one strut.

4. The rigging device of claim 2, further comprising:

two of said second sheaves;

one of said second sheaves stacked below said first sheave and the other of said second sheaves stacked above said first sheave;

wherein said second sheaves and said first sheave attain registration upon said axle; and one of said motors, one of said gearboxes, and one of said signal units upon said plate opposite said second sheave, and the other of said motors, the other of said gearboxes, and the other of said signal units upon said second plate opposite the other of said second sheave.

5. The rigging device of claim 1, further comprising:

said motor being one of electrically powered, pneumatically powered, and hydraulically actuated.

6. The rigging device of claim 5, further comprising:

said gearbox delivering torque from said motor to said axle thus rotating said first sheave and said at least one second sheave.

7. The rigging device of claim 1 wherein said at least one signal unit is radio operated.

8. A rigging device, comprising:

a pulley having a second line wrapped thereon on in one direction, a first line wrapped thereon in the other direction, and another second line wrapped thereon in the same direction as the second line;

an axle operatively connecting through said pulley wherein said axle turns said pulley and thus moves said first line oppositely of said second lines simultaneously;

at least one gear box operatively engaging said axle, at least one motor turning said at least one gear box, at least one signal unit controlling said motor, and, at least one power unit supplying power to said at least one motor;

said pulley having two spaced apart outer plates, two spaced apart inner plates within said outer plates, said outer plates and said inner plates being mutually parallel, three stubs spacing apart said outer plates and said inner plates;

each of said outer plates having an opening to admit said axle;

each of said outer plates having a first diameter and each of said inner plates having a second diameter no more than the first diameter;

said pulley having one of said outer plates, one of said stubs centered thereon, one of said inner plates, the second of said stubs centered thereon, another of said inner plates, the third of said stubs centered thereon, and another of said outer plates;

wherein one of said second lines enwraps between one of said outer plates and a proximate one of said inner plates upon one of said stubs and another of said second lines enwraps between the other of said outer plates and a proximate the other of said inner plates upon the third of said stubs; and wherein said first line enwraps opposite that of said second lines between said inner plates upon the second of said stubs.

9. The rigging device of claim 8, further comprising:

said opening of each of said outer plates being hexagonal; and, said axle having two ends between a length and a hexagonal cross section along the length, said hexagonal cross section fitting tightly into said openings of said outer plates, through said stubs and said inner plates;

a first plate and a mutually parallel and spaced apart second plate;

said first plate having a bearing receiving an end of said axle;

said second plate having a bearing receiving the other end of said axle;

wherein said axle rotates in said bearing during usage; and said motor being one of electrically powered, pneumatically powered, and hydraulically actuated.

10. The rigging device of claim 9, further comprising:

said gearbox delivering torque from said motor to said pulley thus rotating said pulley for simultaneous movement of said first line and said second lines;

said at least one signal unit being radio operated;

an anti-two block connecting to said first plate and said second plate upon at least one strut and operatively engaging said first line;

an anti-two block operatively engaging one of said second lines and connecting to said first plate and said second plate upon at least one strut; and an anti-two block operatively engaging the other of said second lines and connecting to said first plate and said second plate upon at least one strut.

11. A rigging device, comprising:

a pulley having a second line wrapped thereon on in one direction, a first line centered thereon and wrapped thereon in the other direction, and another second line wrapped thereon in the same direction as the second line;

an axle operatively connecting through said pulley wherein said axle turns said pulley and thus moves said first line oppositely of said second lines simultaneously;

at least one gear box operatively engaging said axle, at least one motor turning said at least one gear box, at least one signal unit controlling said motor, and, at least one power unit supplying power to said at least one motor;

said pulley having two spaced apart outer plates, two spaced apart inner plates within said outer plates, said outer plates and said inner plates being mutually parallel, three stubs spacing apart said outer plates and said inner plates;

each of said outer plates having an opening to admit said axle;

each of said outer plates having a first diameter and each of said inner plates having a second diameter no more than the first diameter;

said pulley having one of said outer plates, one of said stubs centered thereon, one of said inner plates, the second of said stubs centered thereon, the other of said inner plates, the third of said stubs centered thereon, and the other of said outer plates;

wherein one of said second lines enwraps between one of said outer plates and a proximate one of said inner plates upon one of said stubs and the other of said second lines enwraps between the other of said outer plates and a proximate the other of said inner plates upon the third of said stubs;

wherein said first line enwraps opposite that of said second lines between said inner plates upon the second of said stubs;

said opening of each of said outer plates being hexagonal;

said axle having two ends between a length and a hexagonal cross section along the length, said hexagonal cross section fitting tightly into said openings of said outer plates, through said stubs and said inner plates;

a first plate and a mutually parallel and spaced apart second plate, said pulley locating between said first plate and said second plate;

said first plate having a bearing receiving an end of said axle;

said second plate having a bearing receiving the other end of said axle; and wherein said axle rotates in said bearing during usage.

12. The rigging device of claim 11, further comprising:

said motor being one of electrically powered, pneumatically powered, and hydraulically powered;

said gearbox delivering torque from said motor to said pulley thus rotating said pulley for simultaneous movement of said first line and said second lines;

said at least one signal unit being radio operated;

an anti-two block connecting to said first plate and said second plate upon at least one strut and operatively engaging said first line; and two anti-two blocks, each operatively engaging one of said second lines and connecting to said first plate and said second plate upon at least one strut.

* * * * *